US011770778B1

(12) United States Patent
Sung (10) Patent No.: US 11,770,778 B1
(45) Date of Patent: Sep. 26, 2023

(54) PMAX CONTROL FOR 5G MULTICARRIER, MULTIBAND SYSTEM

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 197 days.

(21) Appl. No.: 17/365,337

(22) Filed: Jul. 1, 2021

(51) Int. Cl.
*H04W 52/08* (2009.01)
*H04W 52/36* (2009.01)
*H04W 52/24* (2009.01)

(52) U.S. Cl.
CPC ....... *H04W 52/367* (2013.01); *H04W 52/242* (2013.01); *H04W 52/243* (2013.01)

(58) Field of Classification Search
CPC ..... H04W 72/04; H04W 84/12; H04W 88/02; H04W 52/00; H04W 52/04; H04W 52/08; H04W 52/58; H04W 52/18; H04W 80/02; H04W 16/28; H04W 52/10; H04W 36/20; H04W 52/24
See application file for complete search history.

(56) References Cited

U.S. PATENT DOCUMENTS 9,992,751 B1 * 6/2018 Manchanda ........ H04W 52/346
10,939,346 B1 * 3/2021 Park .................. H04W 72/0453

* cited by examiner

*Primary Examiner* — Tu X Nguyen
(74) *Attorney, Agent, or Firm* — SHOOK, HARDY & BACON L.L.P.

(57) ABSTRACT

Methods and systems are provided for controlling a maximum transmit power of a high power user equipment (HPUE) using dedicated signaling. The methods and systems receive signal data corresponding to signals from a carrier cell. Based on the signal data, the methods and systems determine whether an interference level of the carrier cell is above a threshold value. Upon determining that the interference level of the carrier cell is above the threshold value, the methods and systems communicate an indication to the HPUE to transmit at a first power level. Upon determining that the interference level of the carrier cell is below the threshold value, the methods and systems communicate an indication to the HPUE to transmit at a second power level. The first power level is lower than the second power level.

20 Claims, 5 Drawing Sheets

PMAX CONTROL FOR 5G MULTICARRIER, MULTIBAND SYSTEM

SUMMARY

The present disclosure is directed, in part, to methods, systems, and computer-readable media for controlling a maximum transmit power of a high power user equipment (HPUE) using dedicated signaling. For example, signal data corresponding to signals from a carrier cell is received. Based on the signal data, the methods, systems, and computer-readable media determine whether an interference level of the carrier cell is above a threshold value.

In aspects, upon determining that the interference level of the carrier cell is above the threshold value, the methods, systems, and computer-readable media communicate an indication to the HPUE to transmit at a first power level. Additionally, upon determining that the interference level of the carrier cell is below the threshold value, the methods, systems, and computer-readable media communicate an indication to the HPUE to transmit at a second power level. The first power level is lower than the second power level.

In some aspects, the methods, systems, and computer-readable media instruct the HPUE to reduce a transmitting power level upon determining that the interference level of the carrier cell is above the threshold value. Further, the methods, systems, and computer-readable media instruct the HPUE to increase or maintain the transmitting power level upon determining that the interference level of the carrier cell is below the threshold value. In aspects, the interference level is above the threshold value due to interference from an HPUE serviced by a nearby base station.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

4G Fourth-Generation Cellular Communication System
5G Fifth-Generation Cellular Communication System
3GPP Third Generation Partnership Project
CA Carrier Aggregation
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FDD Frequency Division Duplexing
HPUE High-Power User Equipment
LTE Long Term Evolution
MIMO Multiple Input Multiple Output
NR New Radio
OFDM Orthogonal Frequency-Division Multiplexing
PC Personal Computer
PDA Personal Digital Assistant
$P_{max}$ Maximum Allowable Transmit Power
RAM Random Access Memory
RF Radio-Frequency
ROM Read Only Memory
RSRP Reference Transmission Receive Power
RSRQ Reference Transmission Receive Quality
RSSI Received Transmission Strength Indicator
Rx Receive
SINTR Transmission-to-Interference-Plus-Noise Ratio
TDD Time Division Duplexing
TDMA Time Division Multiple Access
Tx Transmit
UE User Equipment
UTRA Universal Terrestrial Radio Access
WiMAX Wireless Inter-operability for Microwave Access Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional telecommunications networks (e.g., 4G and 5G networks) communicate with UEs and HPUEs (high-powered user equipment/wireless devices). HPUEs (e.g., band 14 for 700 MHz bandwidth and band 41) that have a maximum transmit power of 31 dBm are permitted to use the maximum transmit power without consideration of interference factors. As a result, these HPUEs experience higher interference impacts from nearby base stations and/or access points. Additionally, HPUEs are sometimes restricted from using the maximum transmit power without consideration of interference factors. As a result, these HPUEs operate less efficiently. For example, the HPUEs that are unjustifiably restricted from using the maximum transmit power have decreased data coverage when inside a large concrete building or when located near a cell edge.

To enhance HPUE capabilities, the technology disclosed herein properly allocates HPUE resources for enhancing efficient use of HPUE transmit power. For example, embodiments herein determine appropriate conditions for using the maximum transmit power to avoid interferences (e.g., uplink interference to neighboring carrier cells when operating at the maximum transmit power). Additionally, embodiments herein calculate optimal transmit power levels to prevent uplink interference to neighboring carrier cells and other interferences. Further, to enhance efficient use of HPUE capabilities, embodiments herein can alter the transmit power level based on an event, such as the initiation of an uplink 2L MIMO transmission or initiation of an uplink CA transmission.

In addition, the systems and methods disclosed herein alleviate one or more of the problems discussed above. For example, in aspects, the systems and methods disclosed herein control a maximum transmit power of an HPUE using dedicated signaling. Signal data corresponding to signals from a carrier cell are received. Based on receiving the signal data, it is determined whether an interference level of the carrier cell is above a threshold value. Upon determining that the interference level of the carrier cell is above the threshold value, an indication is communicated to the HPUE to transmit at a first power level. Upon determining that the interference level of the carrier cell is below the threshold value, an indication is communicated to the HPUE to transmit at a second power level. The first power level is lower than the second power level.

Further, a particular power level for the HPUE may be determined based on a maximum allowable path loss of the carrier cell and a power limitation of the HPUE. Furthermore, the indication to transmit at the first power level or the second power level may include transmitting dedicated radio resource control signaling that comprises a message with the particular power level to the HPUE. Accordingly, these actions enhance efficient use of the HPUE capabilities by preventing interferences to other carrier cells and by maximizing use of the maximum transmit power of the HPUE.

In some aspects, the methods disclosed herein include a system for controlling a maximum transmit power of an HPUE using dedicated signaling. The system includes a base station having one or more nodes, each of the one or more nodes configured to wirelessly communicate with the HPUE in a serviceable area. The system additionally includes one or more processors in communication with the base station and configured to perform operations. For example, the operations include receiving signal data from the HPUE, the signal data corresponding to signals from a carrier cell. Based on the signal data, the system determines whether an interference level of the carrier cell is above a threshold value. Upon determining that the interference level of the carrier cell is above the threshold value, the HPUE is instructed to reduce a transmitting power level. In embodiments wherein the interference level of the carrier cell is below the threshold value, the system transmits dedicated radio resource control signaling to the HPUE that instructs the HPUE to increase the transmitting power level.

In yet another aspect, one or more non-transitory computer-readable media having computer-executable instructions embodied thereon that, when executed, perform a method for controlling a maximum transmit power of a high power user equipment (HPUE) using dedicated signaling. The method includes receiving signal data corresponding to signals from a carrier cell. Based on the signal data, the method includes determining whether an interference level of the carrier cell is below a threshold value. Upon determining that the interference level of the carrier cell is below the threshold value, the method includes instructing the HPUE to increase or maintain a transmitting power level.

Figure 1:
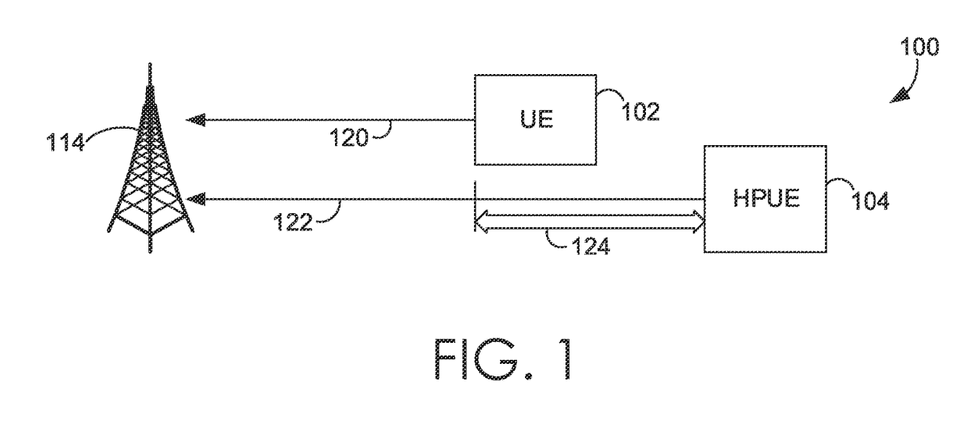
FIG. 1 depicts an example network environment suitable for use in implementations of the present disclosure.

Turning now to FIG. 1, example network environment 100 comprises is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

Network environment 100 comprises UE 102, HPUE 104, cell site 114, UE uplink transmission power 120, HPUE uplink transmission power 122, and cell coverage extension 124. Beginning with the term "UE," "UE" and "user device" are used interchangeably throughout this disclosure to refer to a device employed by an end-user that communicates using a network. As used herein, UE can include any device employed by an end-user to communicate with a wireless telecommunications network. For example, a UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 700 described herein with respect to FIG. 7.

The UE may include a transceiver, which has a circuitry useful in both wirelessly receiving and/or wirelessly transmitting signals. As such, the UE comprises an Rx channel for receiving the signals. In some embodiments, Rx Channel may be combined with a Tx Channel into a single unit. For example, the transceiver may transmit and receive orthogonal frequency division multiplexing signals (e.g., data symbols) to support data communication in wireless applications. Examples of the wireless applications include Personal Area Network networks (e.g., Bluetooth), Wireless Local Area Networks (e.g., 802.11x Wi-Fi), Wide Area Networks (e.g., 3G, 4G, and LTE and LTE-LAA cellular networks), WiMAX, and so forth. The transceiver may also include mode selection circuitry, which enables dynamic selections of various modes of operation. For example, a processor may have the transceiver operate in TDD mode or FDD mode.

Furthermore, UE 102 may comprise any mobile computing device that communicates by way of a wireless network (e.g., 4G, 5G, LTE, or any other type of OFDM based network). In embodiments, UE 102 may be capable of using 5G and having backward compatibility with prior access technologies. In some embodiments, UE 102 may be capable of using 5G but lacks backward compatibility with prior access technologies. In some embodiments, UE 102 is a legacy UE not capable of using 5G.

Turning to HPUE 104, HPUE 104 is a particular class of UE suitable for use in a cellular network (e.g., LTE) and capable of increasing device transmission power. HPUE operates in band 14, band 41, or any other suitable band for increased transmission power. HPUE increased transmission power increases range, coverage, uplink speeds, and connectivity. For example, in some embodiments, UE uplink transmission power 120 is 23 dBm, HPUE uplink transmission power 122 is 29 dBm, and the cell coverage extension 124 is 6 dBm. In some embodiments, HPUE 104 is a separate modem operable with a router, a gateway, and other wireless access devices. In some embodiments, HPUE 104 is module incorporated with a router, a gateway, or another wireless access device.

Turning to cell site 114, the terms "cell site" and "base station" may be used interchangeably herein to refer to a defined wireless communications serviceable area that is serviced by a base station. Cell site 114 may provide wireless communication services to UE 102 and HPUE 104. In particular, cell site 114 may be configured to wirelessly communicate with UE 102 and HPUE 104, which are located within a serviceable area defined by a transmission range and/or receiving range of the radio antennas of the cell site 114.

Cell site 114 may include one or more carriers, band pass filters, radios, antennas, antenna arrays, power amplifiers, transmitters/receivers, digital signal processors, control electronics, GPS equipment, and the like. As discussed herein, cell site 114 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs and/or HPUEs that request to join and/or are connected to the network.

In some aspects, cell site 114 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site. In some aspects, cell site 114 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 114 is in communication with a plurality of in-door small cells. In some embodiments, the network environment includes a heterogeneous network having both the one or more small cells and the one or more macro cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via a multi-user MIMO antenna system).

In some embodiments, cell site 114 comprises at least a first antenna array having one or more antenna elements. In aspects, the one or more antenna elements may be dipole antennas having a length, for example, of ¼, ½, 1, or 1½ wavelength. In aspects, the first antenna array may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz 30 GHz.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array may have a dedicated power supply that supplies power having a certain phase and amplitude to a respective antenna element. In an aspect, the power supply comprises a power amplifier. In various aspects, the power supply may additionally comprise a processor for controlling or adjusting the power supply to the respective antenna element. In some aspects, each power supply may have a maximum power to supply to its respective antenna element. In aspects, the maximum per-antenna supply power may be 2.5 W, 3.5 W, 4 W, 5 W, or more.

Figure 2:
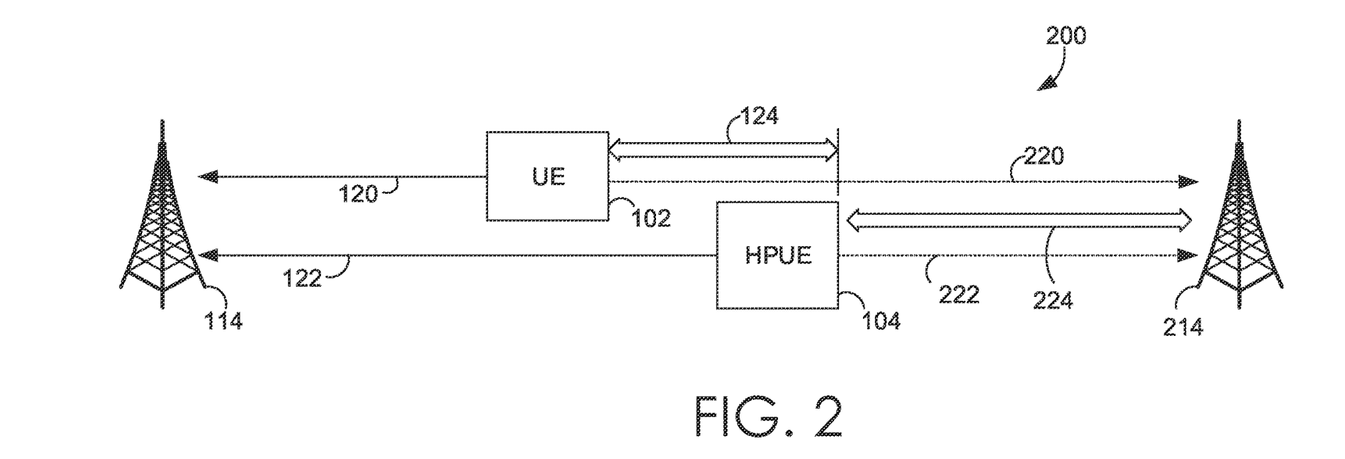
FIG. 2 depicts an example network environment comprising two base stations, the network environment suitable for use in implementations of the present disclosure.

Turning now to FIG. 2, example network environment 200 comprises UE 102, HPUE 104, cell site 114, UE uplink transmission power 120, HPUE uplink transmission power 122, cell coverage extension 124, neighboring cell site 214, UE signals 220 that may be received by the neighboring cell site 214, HPUE signals 222 that may be received by the neighboring cell site 214, and interference 224. In some embodiments, UE 102 is not within a predetermined range of a cell edge corresponding to cell site 114. In some embodiments, HPUE 104 is within the predetermined range of the cell edge. In some embodiments, HPUE 104 is within an overlapping cell edge of both cell site 114 and neighboring cell site 214. In some embodiments, HPUE 104 is using $p_{max}$. In some embodiments, HPUE is operating with a predetermined range of $p_{max}$ and above 23 dBm.

In example network environment 200, UE 102 is serviced by cell site 114 and HPUE 104 is serviced by cell site 114. In aspects, cell site 114 receives signal data corresponding to interference 224 from a carrier cell corresponding to neighboring cell site 214. Continuing the example, cell site 114 determines that an interference level from interference 224 is above a threshold value based on the signal data, the interference level associated with neighboring cell site 214. In other aspects, neighboring cell site 214 receives the signal data corresponding to interference 224, determines the interference level from interference 224 is above the threshold value based on the signal data, and transmits this information to cell site 114. In some embodiments, neighboring cell site 214 receives the signal data and cell site 114 determines the interference level is above the threshold value.

Upon determining that the interference level of the carrier cell corresponding to neighboring cell site 214 is above the threshold value, cell site 114 communicates an indication to the HPUE 104 to transmit at a first power level. Upon determining that the interference level of the carrier cell is below the threshold value, cell site 114 communicates an indication to the HPUE 104 to transmit at a second power level, wherein the first power level is lower than the second power level. In some embodiments, for example, UE uplink transmission power 120 is 23 dBm, HPUE uplink transmission power 122 is 29 dBm, and the cell coverage extension 124 is 6 dBm, which causes a 12 dB interference 224. The neighboring cell site 214 thus experiences 12 dB interference 224 caused by HPUE 104. In some embodiments, the HPUE 104 is operating at $p_{max}$. In other embodiments, the HPUE 104 is operating below $p_{max}$ and above 23 dBm.

In embodiments, the cell site 114 and the neighboring cell site 214 may be in communication with each other (e.g., via a network) and with other cell sites (not depicted), any of which may be located in urban or rural serviceable areas. Further, cell site 114 and neighboring cell site 214 may be in communication via a backhaul (not depicted). The backhaul may be wired or wireless and may comprise dark fiber for 5G communication services. In some embodiments, the cell site 114 and the neighboring cell site 214 have the same carrier. In some embodiments, the network in be a telecommunications network(s), or a portion thereof. The network may comprise a 4G, 5G, or other next generation network. For example, the network may comprise a 3GPP for 5G NR, a 5G NR non-standalone operating in 28 GHz, or a 5G NR standalone with microservices and service-based interfaces for end-to-end support. In some embodiments, the network may comprise a cloud-radio access network located in or associated with a cloud-computing environment having various cloud network components.

A telecommunications network might include an array of devices or components (e.g., one or more cell sites), some of which are not shown. Those devices or components may form network environments similar to what is shown in FIG. 2, and may also perform methods in accordance with the present disclosure. Components such as terminals, links, and nodes (as well as other components) may provide connectivity in various implementations. Example network environment 200 may include multiple networks, as well as being a network of networks, but is shown in more simple form to not obscure other aspects of the present disclosure. Data within example network environment 200 may be stored in one or more databases and/or storage entities.

Figure 3:
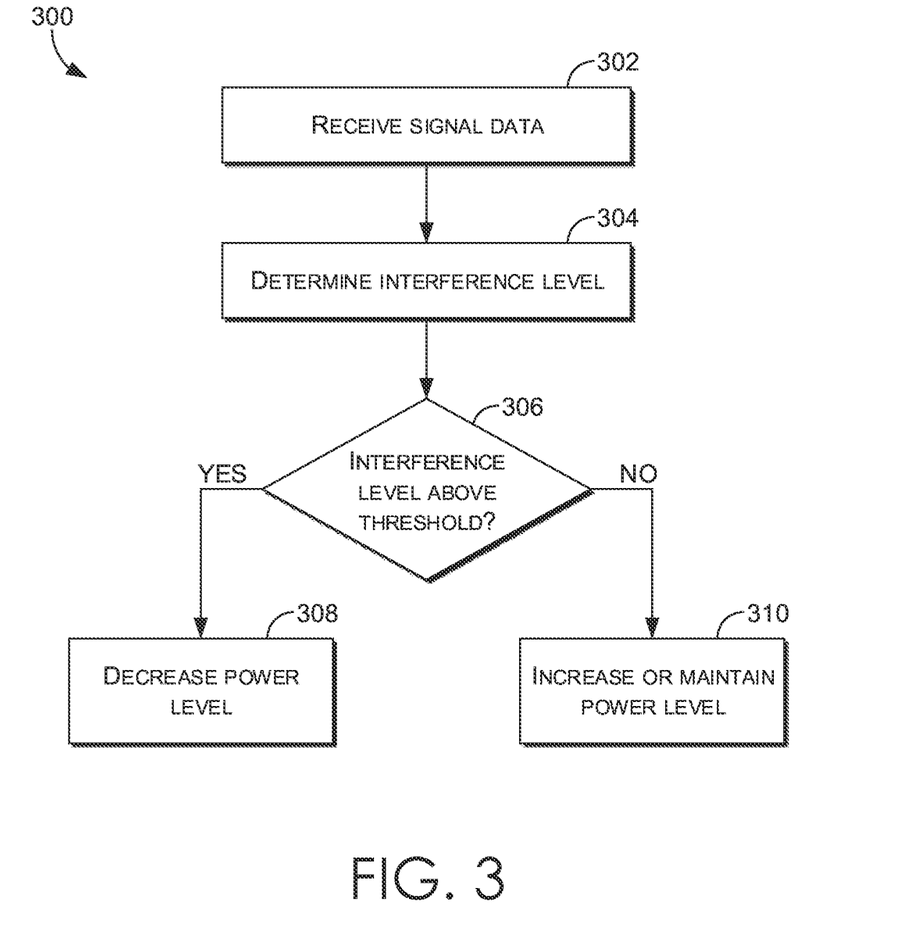
FIG. 3 depicts an example flowchart suitable for use in implementations of the present disclosure.

Turning now to FIG. 3, example flowchart 300 begins with receiving signal data at step 302. The signal data may be received by a first base station servicing an HPUE that is operating at $p_{max}$. In some embodiments, the signal data is received by a second base station that is not in communication with the HPUE. Continuing the example, the signal data includes information from UEs serviced by the second base station comprising one or more of a lower SINR, degradation of network performance and UE experience, and diminished efficiency of use of network resources by the UEs serviced by the second base station.

In some embodiments, the first base station receives the signal data from a network or a backhaul that is in communication with the second base station that is experiencing interference from the HPUE serviced by the first base station. In some embodiments, the second base station includes a neighboring small cell or another neighboring access point that is experiencing interference from the HPUE serviced by the first base station. In aspects, the signal data may correspond to signals from a carrier cell corresponding to the neighboring small cell, neighboring access point, or neighboring base station. In some embodiments, the carrier cell having interference signal data is also a carrier cell of the first base station. In some embodiments, the carrier cell is a single carrier cell system. In other embodiments, the carrier cell is an aggregated carrier cell.

Additionally, the signal data received by the first base station may include an uplink receiver sensitivity level and a maximum transmit power of the HPUE. The uplink receiver sensitivity level may comprise a received signal strength indicator calculated based on a single layer transmission. In embodiments, a first set of the signal data from a first HPUE is received, a second set of the signal data from a second HPUE is received, and a third set of signal data corresponding to the neighboring base station is received by the first base station (or a device in communication with the first base station). For example, the third set of signal data includes interference data that the neighboring base station is experiencing. For example, signal data may include RSRQ of the carrier cell and a corresponding period of measurement. In some embodiments, the first base station and the neighboring base station receive additional signal data after a predetermined period of time. Continuing the example, the additional signal data may be received periodically.

Further, at step 304, a processor, associated with or in communication with the first base station and/or the second base station, determines an interference level of the carrier cell based on the signal data received. In some embodiments, the processor corresponds to the first base station. In other embodiments, the processor corresponds to the neighboring base station (or other access point). In one aspect, the interference level is determined based on a measured SINR for the carrier cell. In some aspects, the interference level is determined using a signal strength detected by a UE or a plurality of UEs serviced by the carrier cell. In some aspects, the interference level is determined by negating intra-cell interference to account only or mostly for interference by the HPUE serviced by a neighboring carrier cell. In some embodiments, the interference level is determined based on an RSSI measured by a UE, and HPUE, and/or a plurality of UEs serviced by the carrier cell.

Further, at step 306, the processor determines whether the interference level of the carrier cell is above a threshold value. In one aspect, the threshold value is determined based on a closed-loop SINR target. In some embodiments, the threshold value is based on a loading balance, RSSI, and/or detected noise. For example, the RSSI may be calculated based on a single layer transmission. In aspects, the RSSI may be determined based on a probe request. further, the threshold value may be adjusted based on a change in load balance and/or a change in the detected noise. Determining whether the interference level of the carrier cell is above the threshold value may include consideration of the RSRQ of the carrier cell and a corresponding period of the measurement of the RSRQ.

If the interference level is above the threshold value, then at step 308, an indication is communicated to the HPUE to transmit at a first power level or to reduce a transmitting power level. For example, a base station servicing or communicating with the HPUE may transmit dedicated radio resource control signaling that comprises a message for the HPUE to operate at a particular power level. The particular power level may be based on a maximum allowable path loss of the carrier cell. The maximum allowable path loss may be determined based on a $p_{max}$ of the HPUE and an uplink receiver sensitivity level. The uplink receiver sensitivity level may comprise a received signal strength indicator calculated based on a single layer transmission. The particular power level may also be based on a power limitation of the HPUE.

In some embodiments, the HPUE will begin transmission at the particular power level indicated in the message upon receipt of the dedicated radio resource control signaling. In some embodiments, the HPUE will begin transmission at the particular power level upon initiation of an uplink 2L MIMO transmission. In some embodiments, a grant is further transmitted to the HPUE for uplink 2L/4L MIMO transmission or uplink carrier aggregation. Additionally, the indication may be transmitted to the HPUE upon receipt of the grant.

If the interference level is below the threshold value, then at step 310, an indication is communicated to the HPUE to transmit at a second power level that is a higher power level than the first power level. In some embodiments, at step 310, the HPUE is instructed to increase the transmitting power level. In some embodiments, at step 310, the HPUE is instructed to maintain the transmitting power level. In some embodiments, at step 310, the HPUE is instructed to transmit at $p_{max}$. In some embodiments, at step 310, the HPUE is instructed to transmit within a range below $p_{max}$. In some embodiments, the base station transmits the dedicated radio resource control signaling to the HPUE.

Figure 4:
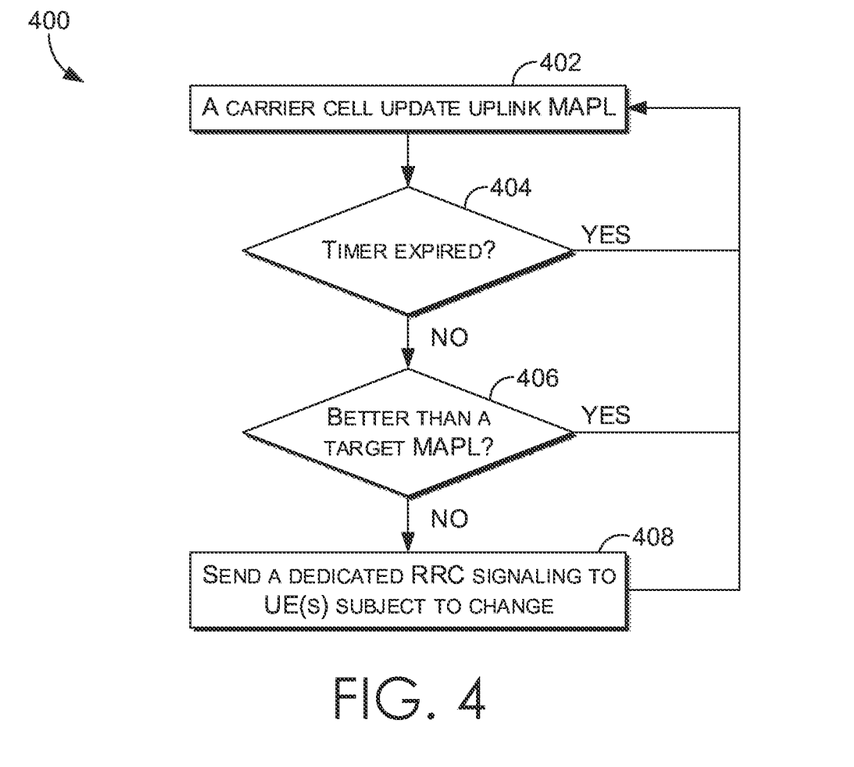
FIG. 4 depicts an example flowchart suitable for use in implementations of the present disclosure.

Turning now to FIG. 4, flowchart 400 begins with updating a carrier cell uplink maximum allowable path-loss (MAPL) at step 402. For example, a $p_{max}$ and a receiver sensitivity level of the uplink are used to determine the MAPL. The receiver sensitivity level corresponds to an RSSI measurement minus one or more measurements of an interfering noise level. The RSSI measurement may be calculated based on a single layer transmission. Additionally, at step 404, a timer is used to continually check the MAPL. If the timer has expired, the MAPL is updated. If the timer has not expired at step 404, the system at 406 determines whether the measured MAPL is better than a target MAPL. If the measured MAPL is better than the target, then the system returns to step 402. If the measured MAPL is not better than the target, then the system sends dedicated radio resource control signaling to the device(s) subject to change at step 408. Stated differently, the system transmits the dedicated radio resource control signaling to the device(s) that need to reduce or increase their respective transmitting power level.

For example, a device that is granted uplink 2L/4L MIMO transmission may need to transmit at twice the power level for uplink 2L MIMO to maintain the same receiver sensitivity level. As such, both the cell and the device benefit by increasing the transmitting power level of the device to $p_{max}$ when the device begins the uplink MIMO transmission. For example, by increasing to $p_{max}$ when the device begins the uplink MIMO transmission, the device has better coverage, speed, and better range and the cell does not experience interference due to the higher transmitting power. Similarly, when a device is granted uplink carrier aggregation transmission (e.g., 2CA/3CA), the device may increase transmitting power to $p_{max}$ when the device begins the uplink carrier aggregation transmission.

Figure 5:
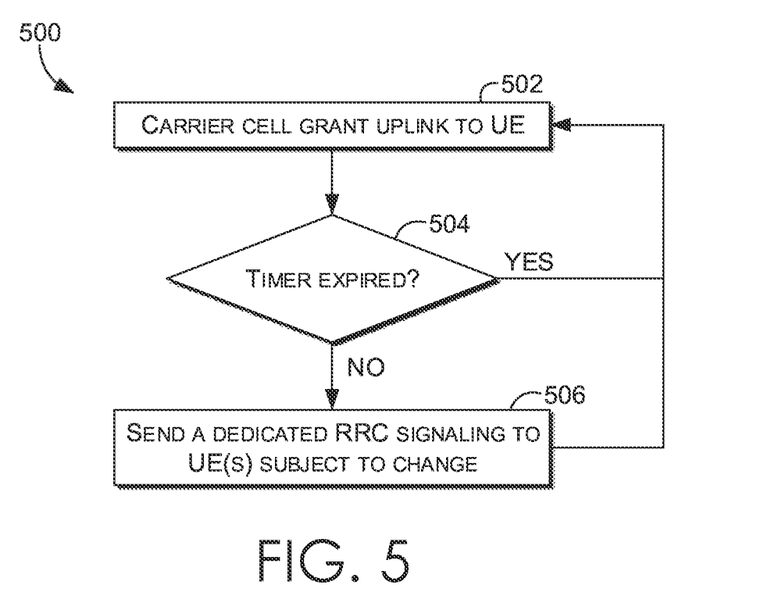
FIG. 5 depicts an example flowchart suitable for use in implementations of the present disclosure.

Turning now to FIG. 5, flowchart 500 begins with a carrier cell granting an uplink to a user device at step 502. In some embodiments, the carrier cell grants an uplink 2L/4L MIMO. In some embodiments, the carrier cell grants an uplink carrier aggregation. Additionally, at step 504, a timer is set. If the timer has expired at step 504, the system checks for additional carrier cell grants at step 502. If the timer has not expired at step 504, the system sends a dedicated radio resource control signal to the device(s) that need to reduce or increase their respective transmitting power level at step 506. Thereafter, the system may return to step 502.

Figure 6:
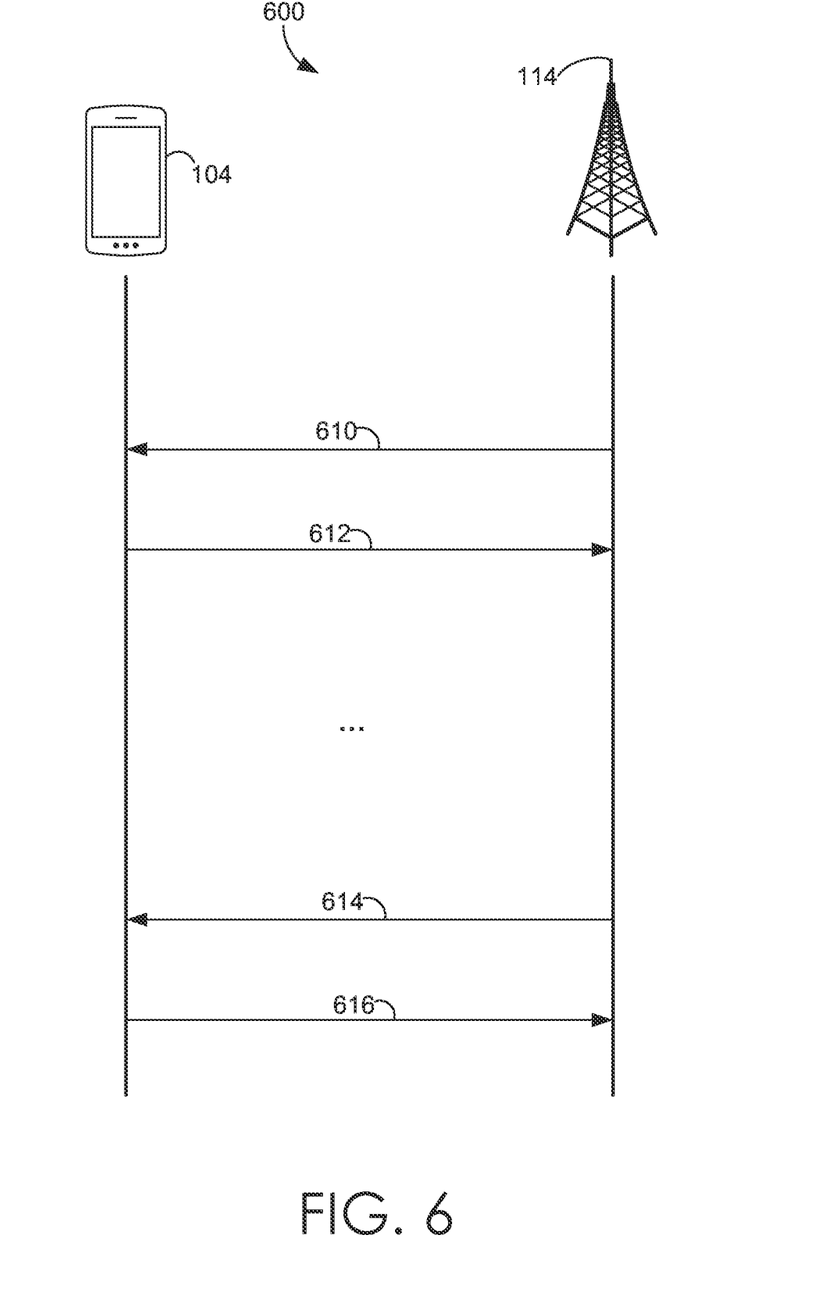
FIG. 6 depicts an example communications diagram, in accordance with aspects of the present disclosure.

Turning now to FIG. 6, example communications diagram 600 includes HPUE 104, cell site 114, a first dedicated radio resource control signal 610, a first acknowledgement 612, a second dedicated radio resource control signal 614, a second acknowledgement 616. In some embodiments, the first dedicated radio resource control signal 610 includes a first message having a first transmitting power level. In some embodiments, the second dedicated radio resource control signal 614 includes a second message having a second transmitting power level that is a higher power level than the first transmitting power level. In embodiments, the first transmitting power level and the second transmitting power level are based on a maximum allowable path loss of the carrier cell corresponding with the HPUE and a power limitation of the HPUE.

Figure 7:
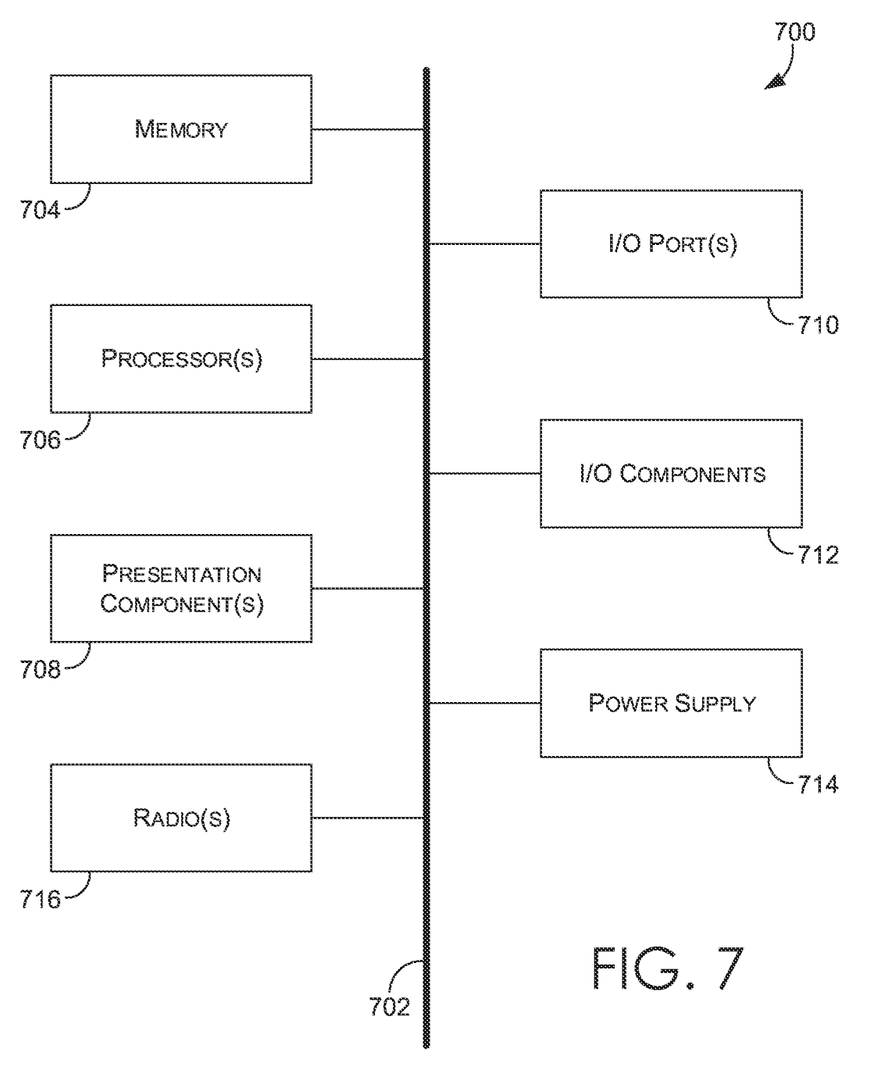
FIG. 7 depicts a diagram of an exemplary computing environment suitable for use in implementations of the present disclosure.

Turning now to FIG. 7, a diagram is depicted of an exemplary computing environment suitable for use in implementations of the present disclosure. In particular, the exemplary computer environment is shown and designated generally as UE/user device 700. User device 700 is but one example of a suitable computing environment and is not intended to suggest any limitation as to the scope of use or functionality of the invention. Neither should user device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, user device 700 includes bus 702 that directly or indirectly couples the following devices: memory 704, one or more processors 706, one or more presentation components 708, input/output (I/O) port(s) 710, I/O component(s) 712, power supply 714, and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O component(s) 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "user device."

User device 700 typically includes a variety of computer-readable media. Computer-readable media can be any available media that can be accessed by user device 700. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 704, memory 704 includes computer-storage media in the form of volatile and/or nonvolatile memory. Memory 704 may be removable, nonremovable, or a combination thereof. Examples of memory 704 include solid-state memory, hard drives, optical-disc drives, etc. For instance, memory 704 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 706, the one or more processors 706 read data from various entities such as bus 702, memory 704 or I/O component(s) 712. The one or more processors 706 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 706 execute instructions, for example, of an Operating System of the user device 700 and/or of one or more suitable applications.

Further, the one or more presentation components 708 present data indications to a person or other device. Examples of one or more presentation components 708 include a display device, speaker, printing component, vibrating component, etc. Additionally, I/O port(s) 710 allow user device 700 to be logically coupled to other devices including I/O component(s) 712, some of which may be built in user device 700. Illustrative I/O component(s) 712 include a microphone, joystick, game pad, satellite dish, scanner, printer, wireless device, etc. Furthermore, power supply 714 may include any suitable source of power, such as a rechargeable lithium polymer battery and/or an alternating current power converter.

Turning to radio 716, the radio 716 facilitates communication with a wireless telecommunications network. For example, radio 716 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 716 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 716 may facilitate include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for controlling a maximum transmit power of a high power user equipment (HPUE) using dedicated signaling, the method comprising:
    receiving signal data corresponding to signals from a carrier cell;
    receiving additional signal data after a predetermined period of time;
    based on the signal data and the additional signal data, determining whether an interference level of the carrier cell is above a threshold value;
    upon determining that the interference level of the carrier cell is above the threshold value, communicating an indication to the HPUE to transmit at a first power level; and
    upon determining that the interference level of the carrier cell is below the threshold value, communicating an indication to the HPUE to transmit at a second power level, wherein the first power level is lower than the second power level.

2. The method of claim 1, further comprising:
    determining a particular power level for the HPUE based on a maximum allowable path loss of the carrier cell and a power limitation of the HPUE; and
    transmitting dedicated radio resource control signaling comprising a message with the particular power level to the HPUE.

3. The method of claim 2, wherein the HPUE transmits at the particular power level upon receiving the dedicated radio resource control signaling.

4. The method of claim 3, wherein the HPUE begins transmitting at the particular power level upon initiation of an uplink 2L MIMO transmission.

5. The method of claim 1, wherein the signal data comprises an uplink receiver sensitivity level and the maximum transmit power of the HPUE.

6. The method of claim 5, wherein the uplink receiver sensitivity level comprises a received signal strength indicator calculated based on a single layer transmission.

7. The method of claim 1, wherein communicating the indication to the HPUE to transmit at the second power level comprises transmitting dedicated radio resource control signaling to the HPUE.

8. The method of claim 1, further comprising:
    receiving a first set of the signal data from a first HPUE, a second set of the signal data from a second HPUE, and a third set of signal data from a network in communication with a nearby base station; and
    based on the first set, the second set, and the third set of the signal data, determining whether the interference level of the carrier cell is above the threshold value.

9. The method of claim 1, wherein communicating the indication to the HPUE to transmit at the second power level includes indicating to the HPUE to maintain a current transmitting power level.

10. The method of claim 1, further comprising:
    transmitting a grant to the HPUE for uplink 2L/4L MIMO transmission or uplink carrier aggregation; and
    communicating the indication to the HPUE to transmit at the first power level or the second power level upon receipt of the grant.

11. The method of claim 1, wherein the uplink receiver sensitivity level corresponds to a received signal strength indicator measurement minus one or more measurements of an interfering noise level.

12. A system for controlling a maximum transmit power of a high power user equipment (HPUE) using dedicated signaling, the system comprising:
    a base station having one or more nodes, each of the one or more nodes configured to wirelessly communicate with the HPUE in a serviceable area; and
    one or more processors in communication with the base station and configured to perform operations comprising:
        receive signal data from the HPUE, the signal data corresponding to signals from a carrier cell;
        based on the signal data, determine that an interference level of the carrier cell is above a threshold value, wherein a nearby base station caused the interference level to be above the threshold value; and
        upon determining that the interference level of the carrier cell is above the threshold value, instruct the HPUE to reduce a transmitting power level.

13. The system of claim 12, wherein the operations further comprise:
    upon determining that the interference level of the carrier cell is below the threshold value, transmit dedicated radio resource control signaling to the HPUE that instructs the HPUE to increase the transmitting power level.

14. The system of claim 12, wherein the operations further comprise:
    upon determining that the interference level of the carrier cell is below the threshold value, instruct the HPUE to maintain the transmitting power level.

15. The system of claim 12, wherein the transmitting power level for the HPUE is determined based on a maximum allowable path loss of the carrier cell and a power limitation of the HPUE.

16. One or more non-transitory computer-readable media having computer-executable instructions embodied thereon that, when executed, perform a method for controlling a maximum transmit power of a high power user equipment (HPUE) using dedicated signaling, the method comprising:
    receiving signal data corresponding to signals from a carrier cell;
    based on the signal data, determining whether an interference level of the carrier cell is below a threshold value; and upon determining that the interference level of the carrier cell is below the threshold value, instructing the HPUE to increase or maintain a transmitting power level, wherein the transmitting power level is based on a maximum allowable path loss of the carrier cell and a power limitation of the HPUE.

17. The media of claim 16, wherein the maximum allowable path loss corresponds to an uplink receiver sensitivity level and the maximum transmit power.

18. The media of claim 16, further comprising:
receiving additional signal data after a predetermined period of time;
based on the additional signal data, determining that the interference level of the carrier cell is above the threshold value; and
instructing the HPUE to reduce the transmitting power level upon determining that the interference level of the carrier cell is above the threshold value.

19. The media of claim 18, wherein a nearby base station caused the interference level to be above the threshold value, and wherein the HPUE was operating at the maximum transmit power during the determination that the interference level is above the threshold value.

20. The media of claim 16, wherein the HPUE is instructed to increase the transmitting power level when the HPUE begins an uplink MIMO transmission.

* * * * *